US010746129B2

(12) United States Patent
Mansouri

(10) Patent No.: US 10,746,129 B2
(45) Date of Patent: Aug. 18, 2020

(54) SYSTEM FOR ACTUATING A MOVABLE STRUCTURE OF A THRUST REVERSER OF AN AIRCRAFT, THRUST REVERSER AND JET ENGINE COMPRISING SUCH A SYSTEM

(71) Applicant: SAFRAN ELECTRONICS & DEFENSE, Boulogne Billancourt (FR)

(72) Inventor: Badr Mansouri, Boulogne Billancourt (FR)

(73) Assignee: Safran Electronics & Defense, Boulogne-Billancourt (FR)

( * ) Notice: Subject to any disclaimer, the term of this patent is extended or adjusted under 35 U.S.C. 154(b) by 302 days.

(21) Appl. No.: 15/524,529

(22) PCT Filed: Oct. 30, 2015

(86) PCT No.: PCT/EP2015/075343
§ 371 (c)(1),
(2) Date: May 4, 2017

(87) PCT Pub. No.: WO2016/071242
PCT Pub. Date: May 12, 2016

(65) Prior Publication Data
US 2017/0321635 A1 Nov. 9, 2017

(30) Foreign Application Priority Data
Nov. 6, 2014 (FR) ..................... 14 60747

(51) Int. Cl.
*F02K 1/76* (2006.01)
*F02K 1/56* (2006.01)

(52) U.S. Cl.
CPC ............. *F02K 1/763* (2013.01); *F02K 1/56* (2013.01); *F02K 1/76* (2013.01); *F05D 2260/90* (2013.01);
(Continued)

(58) Field of Classification Search
CPC ... F02K 1/76; F02K 1/763; F02K 1/70; F02K 1/72
See application file for complete search history.

(56) References Cited

U.S. PATENT DOCUMENTS 4,586,329 A * 5/1986 Carlin ............... F02K 1/76
188/82.3
6,167,694 B1 * 1/2001 Davies ............... F02K 1/763
60/226.2
(Continued)

FOREIGN PATENT DOCUMENTS

EP 1004798 A1 5/2000
EP 1780394 A2 5/2007
(Continued)

*Primary Examiner* — Andrew H Nguyen
(74) *Attorney, Agent, or Firm* — Muncy, Geissler, Olds & Lowe, P.C.

(57) ABSTRACT

An actuator system for actuating a movable structure of a thrust reverser, the system including a first motor, a first actuator driven by the first motor, a second actuator, and a first transmission shaft that is connected to the second actuator and to the first motor so that the second actuator is driven by the first motor, a second motor, a third actuator driven by the second motor, a fourth actuator, and a second transmission shaft that is connected to the fourth actuator and to the second motor so that the fourth actuator is driven by the second motor, and control means for controlling the motors to cause the first actuator, the second actuator, the third actuator, and the fourth actuator to be driven synchronously by the two motors. The invention also relates to a thrust reverser and to a jet engine fitted with such an actuator system.

9 Claims, 1 Drawing Sheet

(52) U.S. Cl.
CPC .... *F05D 2270/051* (2013.01); *F05D 2270/62* (2013.01); *Y02T 50/672* (2013.01)

(56) References Cited

U.S. PATENT DOCUMENTS

| | | | |
|---|---|---|---|
| 9,605,736 B1* | 3/2017 | Foshage | F16H 25/2252 |
| 2003/0019206 A1* | 1/2003 | Johnson | F02K 1/72 |
| | | | 60/204 |
| 2004/0035653 A1* | 2/2004 | Christensen | B64C 13/50 |
| | | | 188/135 |
| 2004/0118974 A1* | 6/2004 | Colotte | F02K 1/76 |
| | | | 244/110 B |
| 2008/0229851 A1* | 9/2008 | Jones | B64C 13/28 |
| | | | 74/89.39 |
| 2014/0131480 A1* | 5/2014 | Hurlin | F02K 1/72 |
| | | | 239/265.19 |

FOREIGN PATENT DOCUMENTS

| | | |
|---|---|---|
| EP | 1972548 A2 | 9/2008 |
| FR | 2920202 A1 | 2/2009 |

\* cited by examiner

SYSTEM FOR ACTUATING A MOVABLE STRUCTURE OF A THRUST REVERSER OF AN AIRCRAFT, THRUST REVERSER AND JET ENGINE COMPRISING SUCH A SYSTEM

The invention relates to an actuator system for actuating a movable structure of an aircraft thrust reverser (also known as a "transcowl"). The invention also provides a thrust reverser including such an actuator system. The invention also provides an aircraft jet engine including such an actuator system.

TECHNOLOGICAL BACKGROUND OF THE INVENTION

A thrust reverser of an aircraft turbojet engine serves to improve the braking capacity of the aircraft by redirecting a fraction of the ejection stream from the turbojet engine towards the front of the nacelle associated with the turbojet engine. Various types of thrust reverser are thus known. Under all circumstances, a thrust reverser comprises at least one movable structure that is movable between a neutral position and an active position in which the movable structure serves to deflect the ejection stream towards the front of the nacelle. An actuator system is associated with the movable structure in order to cause the movable structure to move in reversible manner between the neutral position and the active position.

For this purpose, an actuator system for a movable structure is known that includes an electric motor, four actuators associated with the movable structure, and four flexible transmission shafts, each flexible transmission shaft being connected firstly to a respective one of the actuators and secondly to the motor so that the various actuators can be driven by the motor. Under such circumstances, when the motor is powered, it drives the four actuators that in turn move the movable structure.

Nevertheless, since the movable structure is usually made of composite material, it presents great flexibility. Under such circumstances, a shift of synchronization between the various actuators leads to significant deformation of the movable structure, and thus potentially to damaging the movable structure. Furthermore, if the movable structure reaches its active position while deformed, it might no longer correctly deflect the ejection stream towards the front of the nacelle, thereby reducing the effectiveness of the thrust reverser. Furthermore, if the movable structure reaches its neutral position while deformed, it may no longer correctly close the thrust reverser completely, thereby leading to an undesirable leak of a fraction of the ejection stream from the turbojet engine towards the front of the nacelle.

OBJECT OF THE INVENTION

An object of the invention is to propose an actuator system for actuating a movable structure of an aircraft thrust reverser that limits the risks of significant deformation of the movable structure during movement of the structure by the actuator system, and also to propose a thrust reverser and a jet engine fitted with such an actuator system.

BRIEF DESCRIPTION OF THE INVENTION

In order to achieve this object, the invention provides an actuator system for actuating a movable structure of a thrust reverser of an aircraft, the system comprising:

a first electric motor;
a first actuator arranged in the proximity of the first electric motor in order to be driven by the first electric motor;
a second actuator and a first flexible transmission shaft that is connected firstly to the second actuator and secondly to the first electric motor so that the second actuator is arranged to be driven by the first electric motor;
a second electric motor;
a third actuator arranged in the proximity of the second electric motor in order to be driven by the second electric motor;
a fourth actuator and a second flexible transmission shaft that is connected firstly to the fourth actuator and secondly to the second electric motor so that the fourth actuator is driven by the second electric motor; and
control means for controlling the electric motors to synchronize drive of the first actuator, of the second actuator, of the third actuator, and of the fourth actuator by means of the two motors.

Because of the presence of two motors and of the control means, it is possible to detect any error of synchronization between the two motors, and to correct the control setpoints generated by the control means for the two motors accordingly. The actuator system of the invention thus makes it possible to avoid the various actuators becoming desynchronized by controlling the two motors, thereby limiting deformation of the movable structure during movement of the movable structure by the actuator system. It is thus possible quickly to detect the beginning of deformation of the movable structure and to adapt accordingly the control applied to the two motors in order to correct the deformation.

In addition, the particular arrangement of two actuators, each driven by a dedicated motor, makes it possible to have relatively short transmissions of torque between a motor and the actuators associated therewith, thereby further limiting any risk of the actuators becoming desynchronized and thus any risk of the movable structure being deformed.

The invention also provides an aircraft thrust reverser comprising a movable structure and an actuator system as described above, the system being arranged in such a manner as to move the movable structure between a neutral position and an active position in which the movable structure serves to deflect an ejection stream from a jet engine of the aircraft towards the front of the aircraft.

Furthermore, the invention provides an aircraft jet engine including a thrust reverser comprising a movable structure and an actuator system as described above, the system being arranged so as to move the movable structure between a neutral position and an active position in which the movable structure serves to deflect an ejection stream from the jet engine towards the front of the aircraft.

BRIEF DESCRIPTION OF THE DRAWING

The invention can be better understood in the light of the following description of a particular, non-limiting embodiment of the invention. Reference is made to the accompanying figures, in which.

DETAILED DESCRIPTION OF THE INVENTION

Figure 1:
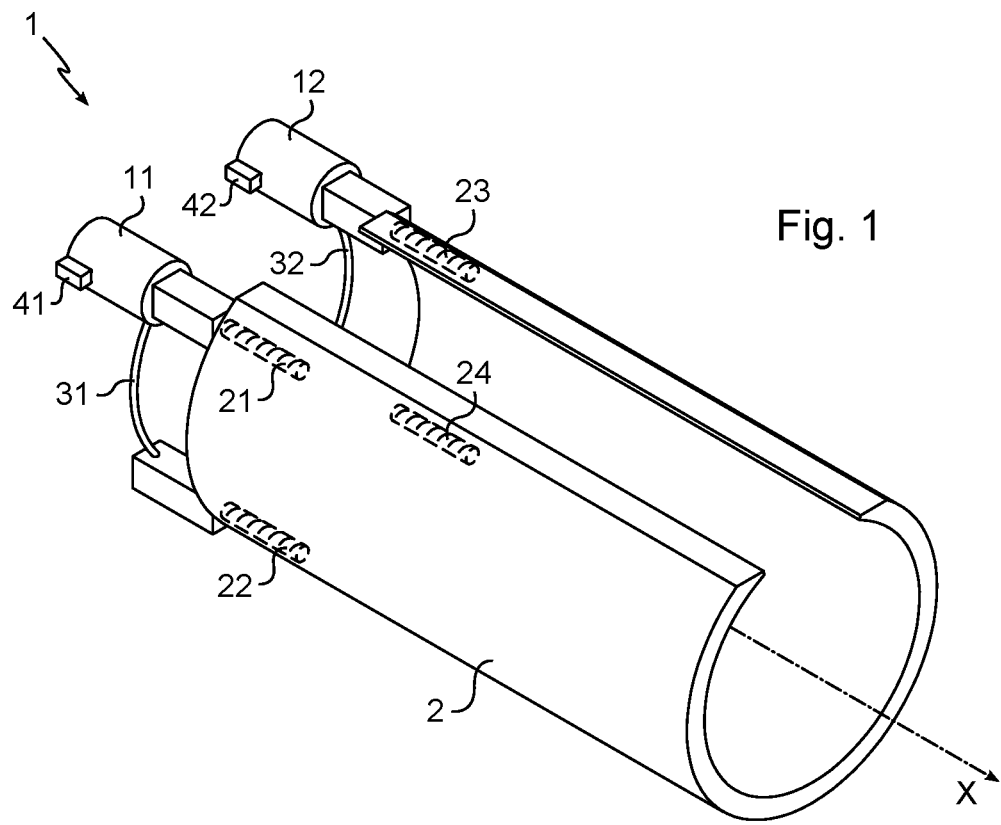
FIG. 1 is a diagrammatic perspective view of a movable structure and of an actuator system of the invention associated with said movable structure, the calculation member not be shown.
Figure 2:
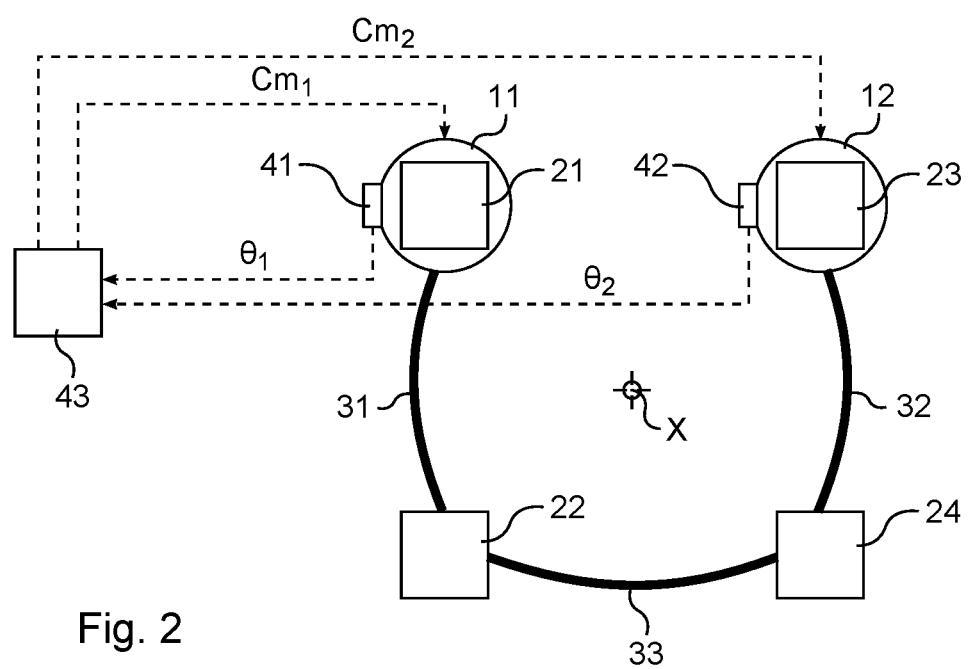
FIG. 2 is a diagrammatic end view of the actuator system shown in FIG. 1, the movable structure not being shown.

With reference to FIGS. 1 and 2, the actuator system 1 of the invention in this example is for moving a single movable structure 2 of a turbojet engine thrust reverser (not shown) of an aircraft in translation along a translation axis X between a neutral position and an active position in which the movable structure 2 serves to deflect the ejection stream from the turbojet engine towards the front of the aircraft.

For this purpose, the actuator system 1 has a first electric motor 11 and a second electric motor 12. In this example, the two electric motors 11 and 12 are identical and can therefore deliver the same mechanical power. Both motors 11 and 12 are permanent magnet synchronous machines.

Furthermore, the actuator system 1 has four actuators, all of which in this example are ball jackscrews, and they are referred to below as the first actuator 21, the second actuator 22, the third actuator 23, and the fourth actuator 24.

In this example, the first actuator 21 is driven directly by the first motor 11 so that there is no flexible transmission shaft connecting the first actuator 21 to the first motor 11. The first actuator 21 is integral with the first motor 11.

Symmetrically, the third actuator 23 in this example is driven directly by the second motor 12 so that no flexible transmission shaft connects the third actuator 23 to the second motor 12. The third actuator 23 is integral with the second motor 12.

Furthermore, the actuator system 1 has a first flexible transmission shaft 31 that is connected directly both to the second actuator 22 and also to the first motor 11 so that the second actuator 22 can be driven by the first motor 11. Likewise, the actuator system 1 has a second flexible transmission shaft 32 that is connected directly both to the fourth actuator 24 and also to the second motor 12 so that the fourth actuator 24 can be driven by the second motor 12.

Under such circumstances, the particular arrangement of the actuators and of the motors makes it possible to transmit torque directly between the first motor 11 and the first actuator 21 and between the second motor 12 and the third actuator 23, and also to provide relatively short transmissions between the first motor 11 and the second actuator 22 and between the second motor 12 and the fourth actuator 24, thereby limiting risks of the actuators losing synchronization and thus limiting risks of the movable structure deforming.

Advantageously, only two flexible transmission shafts 31 and 32 are thus needed to enable all four actuators 21, 22, 23, and 24 to be driven. This limits the number of flexible transmission shafts in the actuator system 1, which shafts are very flexible and can lead to the actuators to which they are connected losing synchronization. Furthermore, because of their flexibility, the flexible transmission shafts may be subjected to mechanical resonance modes that are sometimes difficult to compensate.

The four actuators 21, 22, 23, and 24 are preferably arranged at regular intervals around one of the edges 3 of the movable structure 2, an edge being a cross-section at the end of the movable structure 2 normal to the axis X of movement in translation.

As a result, the movable structure 2 is subjected to thrust around its edge by the four actuators 21, 22, 23, and 24 in a manner that is distributed, thereby limiting any risk of said movable structure 2 being deformed. In a preferred embodiment, the two motors 11 and 12, and thus the first actuator 21 and the third actuator 23, are arranged on the movable structure 2 at zones of maximum deformation of said movable structure 2, i.e. at zones that deform the most easily.

The first motor 11 and the first actuator 21 in this example are positioned at one of the ends of the edge 3, and the second motor 12 and the third actuator 23 are positioned at the other end of the edge 3, it being understood that the edge 3 is of section that is open.

This further limits any risk of the movable structure 2 deforming while it is moving. Specifically, the two motors 11 and 12 are arranged at the ends of the movable structure 2 in such a manner that any error of synchronization between the ends of the movable structure 2, due to maximum deformation of the movable structure 2, can be detected and corrected.

To this end, the actuator system 1 includes control means for controlling the motors 11 and 12 in order to synchronize drive of the first actuator 21, of the second actuator 22, of the third actuator 23, and of the fourth actuator 24 by the two motors 11 and 12. More precisely, the control means are configured to servo-control the angular positions of the two motors 11 and 12 so as to govern synchronous drive of the various actuators 21, 22, 23, and 24. In particular manner, the control means comprise a first angular position sensor associated with the first motor 11 and a second angular position sensor associated with the second motor 12. For example, the control means include a first resolver 41 associated with the first motor 11 and a second resolver 42 associated with the second motor 12. The control means further include a calculation member 43 generating a first angular position setpoint $C_{m1}$ for the first motor 11 and a second angular position setpoint $C_{m2}$ for the second motor 12, as a function of angular position information $\theta_1$ generated by the first resolver 41 and of angular position information $\theta_2$ generated by the second resolver 42.

In the event of a synchronization error between the two motors 11 and 12, the calculation member 43 detects a difference between the angular portions $\theta_1$ and $\theta_2$ as supplied by the two resolvers 41 and 42, and adapts the setpoints $C_{m1}$ and $C_{m2}$ for the two motors 11 and 12 accordingly.

The actuator system 1 can thus quickly detect a problem of synchronization between the motors 11 and 12 and thus between the actuators 21, 22, 23, and 24, and it can correct the problem effectively, thereby limiting any risk of the movable structure 2 deforming.

The actuator system 1 preferably includes a third flexible transmission shaft 33 connected firstly to the second actuator 22 and secondly to the fourth actuator 24 so as to provide a driving link between the second actuator 22 and the fourth actuator 24. Since the actuators 21, 22, 23, and 24 are regularly distributed along the edge 3 of the movable structure 2, the three flexible transmission shafts 31, 32, and 33 in this example are of substantially the same length.

It should be observed that even without the third flexible transmission shaft 33, the actuators 21, 22, 23, and 24 can be synchronized correctly by the two motors 11 and 12. The third flexible transmission shaft 33 advantageously serves to further improve the synchronization between the various actuators 21, 22, 23, and 24, thereby limiting any risk of the movable structure 2 deforming.

In addition, since the second actuator 22 and the fourth actuator 24 are each connected to both motors 11 and 12, in the event of any one of the flexible transmission shafts 31, 32, and 33 being lost, the second actuator 22 and the fourth actuator 24 can nevertheless be driven by one of the two motors 11 and 12, thereby ensuring that the movable structure 2 is driven mechanically jointly by the four actuators 21, 22, 23, and 24. Likewise, the presence of the third flexible transmission shaft 33 and of the two motors 11 and 12 makes it possible to ensure that the movable structure 2 is driven mechanically jointly by the four actuators 21, 22, 23, and 24, even in the event of losing one of the motors 11 and 12.

Furthermore, in the event of a motor, an actuator, or a flexible transmission shaft seizing, the calculation member 43 is arranged to generate setpoints for generating alternating jolts in the two motors 11 and 12. As a result of the forces applied in alternation to the two ends of a drive chain constituted by the motors 11, 12, the actuators 21, 22, 23, and 24, and the flexible transmission shafts 31, 32, and 33, with the motors 11 and 12 being at the ends of said chain, this can make it possible to release the motor, the actuator, or the flexible transmission shaft that was blocked.

In a particular embodiment, the two motors 11 and 12 are designed so that each of them is capable on its own of driving all four actuators 21, 22, 23, and 24, but at a speed that is lower than the speed at which the four actuators 21, 22, 23, and 24 can be driven when both motors 11 and 12 are powered. More particularly, both motors 11 and 12 are designed so that the sum of the powers from the two motors 11 and 12 is equal to the power needed for driving the four actuators 21, 22, 23, and 24 during nominal operation.

Thus, the two motors 11 and 12 remain reasonable in size and weight compared to the situation in which each of them is designed to be capable on its own of driving all four actuators 21, 22, 23, and 24 at a speed equal to the speed at which all four actuators 21, 22, 23, and 24 can be driven when both motors 11 and 12 are powered.

Naturally, the present invention is not limited to the embodiment described and variants may be applied thereto without going beyond the ambit of the invention as defined by the claims.

In particular, although in this example the first actuator is driven directly by the first motor, the first actuator could merely be arranged in the proximity of the first motor. The actuator system would then include a short flexible transmission shaft, and in particular a flexible transmission shaft of length that is much shorter than the length of the flexible transmission shaft connecting the second actuator to the first motor or connecting the fourth actuator to the second motor, which would then be connected firstly to the first actuator and secondly to the first motor, so that the first actuator can be driven by the first motor. Likewise, although in this example the third actuator is driven directly by the second motor, the third actuator could merely be arranged in the proximity of the second motor. The actuator system would then include a short flexible transmission shaft, and in particular a flexible transmission shaft of length much shorter than the length of the flexible transmission shaft connecting the second actuator to the second motor or connecting the fourth actuator to the second motor, which would then be connected firstly to the third actuator and secondly to the second motor, so that the third actuator can be driven by the third motor. Nevertheless, it is preferable for the first motor to drive the first actuator directly and for the second motor to drive the third actuator directly.

Although in this example the first flexible transmission shaft is connected directly to the first motor, said shaft could be connected directly to the first actuator and to the second actuator so that the second actuator is driven by the first motor via the first actuator. The first flexible transmission shaft would then be connected to the first motor via the first actuator. In addition, although in this example the second flexible transmission shaft is connected directly to the second motor, said shaft could be connected directly to the third actuator and to the fourth actuator so that the fourth actuator is driven by the second motor via the third actuator. The second flexible transmission shaft could then be connected to the second motor via the third actuator.

The actuator system need not include a third flexible transmission shaft between the second actuator and the fourth actuator.

Furthermore, the actuator system may include a greater number of actuators and/or of motors than described, providing it has fewer motors than actuators in order to avoid making the actuator system too heavy.

Although in this example the motors are arranged at the ends of the edge of the movable structure, the motors could be arranged in other zones of the movable structure. Nevertheless, it is preferable for the motors to be arranged at said ends of the edge of the movable structure.

Furthermore, Although in this example the actuators are distributed regularly around the periphery of the edge of the movable structure, the actuators could be distributed so that the distance between the second and fourth actuators is greater than the distance between the first and second actuators (or between the third and fourth actuators) in order to limit the lengths of the first flexible transmission shaft and of the second flexible transmission shaft. Under such circumstances, the system should preferably include a third flexible transmission shaft between the second actuator and the fourth actuator, of length that is thus longer than the lengths of the other two flexible transmission shafts, in order to enhance synchronization between the various actuators, and in particular between the second actuator and the fourth actuator.

The invention claimed is:

1. An actuator system for actuating a single cover of an aircraft thrust reverser of an aircraft jet engine, the single cover extending substantially around the jet engine, the system comprising:
    a first electric motor;
    a first actuator arranged in the proximity of the first motor in order to be driven by the first motor;
    a second actuator and a first flexible transmission shaft that is connected firstly to the second actuator and secondly to the first motor so that the second actuator is arranged to be driven by the first motor;
    a second electric motor;
    a third actuator arranged in the proximity of the second motor in order to be driven by the second motor;
    a fourth actuator and a second flexible transmission shaft that is connected firstly to the fourth actuator and secondly to the second motor so that the fourth actuator is driven by the second motor; wherein the cover is mechanically driven by the first, second, third and fourth actuators; and
    control means for controlling the motors to synchronize drive of the first actuator, of the second actuator, of the third actuator, and of the fourth actuator by means of the two motors, said control means including two resolvers associated respectively with the first and second electric motors and a calculation member arranged for detecting angular positions of the two motors supplied by the two resolvers, wherein in an event of a difference between the angular positions of the two motors detected by the calculation member, the calculation member generating first angular position setpoints for the first and second electric motors accordingly to synchronize drive of the first actuator, the second actuator, the third actuator, and the fourth actuator so as to correct deformation of the cover during movement;

the system further including a third flexible transmission shaft that is connected firstly to the second actuator and secondly to the fourth actuator in such a manner that each of the first actuator, the second actuator, the third actuator and the fourth actuator is movable by each of the two motors.

2. The system according to claim 1, wherein the motors, the first actuator, and the third actuator, are arranged on the cover at zones of maximum deformation of said cover during a movement of said cover.

3. The system according to claim 2, wherein the first motor and the first actuator are arranged at one of the ends of an edge of the cover, and the second motor and the third actuator are arranged at the other end of said edge.

4. The system according to claim 1, wherein the first motor and the first actuator are arranged so that the first actuator is driven directly by the first motor and/or wherein the second motor and the third actuator are arranged in such a manner that the third actuator is driven directly by the second motor.

5. The system according to claim 1, wherein the first flexible transmission shaft is connected directly to the first motor and/or the second flexible transmission shaft is connected directly to the second motor.

6. An aircraft thrust reverser comprising the actuator system according to claim 1, the system being arranged so as to move the cover between a neutral position and an active position in which the cover serves to deflect an ejection stream from the jet engine of an aircraft towards a front of the aircraft, the single cover being attached to each one of the first actuator, the second actuator, the third actuator and the fourth actuator.

7. An aircraft jet engine comprising the actuator system according to claim 1, the system being arranged in such a manner as to move the cover between a neutral position and an active position in which the cover serves to deflect an ejection stream from the jet engine towards a front of an aircraft, the single cover being attached to each one of the first actuator, the second actuator, the third actuator and the fourth actuator.

8. An actuator system according to claim 1, wherein the first, second, third and fourth actuators are regularly distributed so that the first flexible transmission shaft, the second flexible transmission shaft and the third flexible transmission shaft have the same length.

9. An actuator system according to claim 1, wherein in the event of any of the first and second electric motors, any of the first, second, third and fourth actuators, or any of the first, second and third flexible transmission shafts seizing, the calculation member is arranged to generate second angular position setpoints for the two motors so as to apply jolting forces in alternation to a drive chain constituted by the first and second motors, the first, second, third, and fourth actuators, and the first, second, and third flexible transmission shafts.

* * * * *